(12) United States Patent
Otsuka et al.

(10) Patent No.: US 10,882,234 B2
(45) Date of Patent: Jan. 5, 2021

(54) MOLD

(71) Applicant: OLYMPUS CORPORATION, Hachioji (JP)

(72) Inventors: Yoshitaka Otsuka, Hino (JP); Hiroshi Yonekubo, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 16/712,877

(22) Filed: Dec. 12, 2019

(65) Prior Publication Data
US 2020/0114557 A1 Apr. 16, 2020

Related U.S. Application Data

(63) Continuation of application No. PCT/JP2018/021198, filed on Jun. 1, 2018.

(30) Foreign Application Priority Data

Jun. 16, 2017 (JP) .................................. 2017-119078

(51) Int. Cl.
*B29C 45/36* (2006.01)

(52) U.S. Cl.
CPC .................................. *B29C 45/36* (2013.01)

(58) Field of Classification Search
CPC ..... B29C 45/36; B29C 45/401; B29C 45/561; B29C 2045/4063; B29C 45/40; B29L 2011/0016
See application file for complete search history.

(56) References Cited

U.S. PATENT DOCUMENTS

2014/0346691 A1* 11/2014 Otsuka .................. B29C 45/401
264/1.1
2017/0023762 A1* 1/2017 Tobita ................ G02B 27/0018

FOREIGN PATENT DOCUMENTS

JP 2007261142 A 10/2007
JP 2008183754 A 8/2008
(Continued)

OTHER PUBLICATIONS

International Search Report (ISR) dated Jun. 26, 2018 (and English translation thereof), issued in International Application No. PCT/JP2018/021198.
(Continued)

*Primary Examiner* — Joseph S Del Sole
*Assistant Examiner* — Mohamed K Ahmed Ali
(74) *Attorney, Agent, or Firm* — Holtz, Holtz & Volek PC (57) ABSTRACT

A mold includes: a fixed mold including a first mold plate; a movable mold including a second mold plate; and a molding cavity by combining the fixed mold and the movable mold with each other. At least one of the first and the second mold plates includes: a nest in a stepped pillar shape, the nest including a large diameter portion engaged in the insertion hole, and a small diameter portion in which a transfer surface to form an optical function surface of a molded product is formed; and an outer-diameter forming member in a stepped cylindrical shape, the outer-diameter forming member including a cylindrical portion arranged around the small diameter portion of the nest, and engaged in the insertion hole, and a flange portion in which a transfer surface to form an outer diameter portion of the molded product is formed.

3 Claims, 4 Drawing Sheets

(56) References Cited

FOREIGN PATENT DOCUMENTS

| JP | 2010194779 A | 9/2010 |
| JP | 2012022074 A | 2/2012 |
| JP | 2015140007 A | 8/2015 |
| WO | 2008078395 A1 | 7/2008 |

OTHER PUBLICATIONS

Written Opinion of the International Searching Authority dated Jun. 26, 2018 issued in International Application No. PCT/JP2018/021198.

* cited by examiner

MOLD

This application is a continuation of PCT International Application No. PCT/JP2018/021198 filed on Jun. 1, 2018, which designates the United States, incorporated herein by reference, and which claims the benefit of priority from Japanese Patent Application No. 2017-119078, filed on Jun. 16, 2017, incorporated herein by reference.

BACKGROUND

The present disclosure relates to a mold.

Generally, lenses used in digital cameras, endoscopes, microscopes, mobile phones, and the like are manufactured by cavity molding of resin. In the cavity molding, by filling a heat-softened thermoplastic material or energy curing material in a cavity formed between two molds having a parting line (hereinafter, "P. L.") as their boundary, a highly-accurately formed lens is obtained.

Lenses obtained by the cavity molding as above are used by combining plural pieces, or used combined with an imager (image sensor). In such a case, it is necessary to assemble it such that an optical axis deviation (lens decentering degree) among lenses, and between a lens and the imager is small, and it is demanded to keep an axis deviation between an outer diameter portion (cut end portion) to be a guide in assembling and an optical axis of a lens portion in which an optical function surface is formed (hereinafter, "outer-diameter decentering degree") small.

For example, JP-A-2012-22074 discloses a technique in which a conical surface in a protruding shape that engages with a silver tube is arranged on an outer diameter portion on an outer side of a lens unit when forming a lens by injection molding, to improve accuracy in coaxiality between the lens unit and the conical surface, and to improve the outer-diameter centering accuracy.

Moreover, JP-A-2008-183754 discloses a mold that includes an upper and a lower mold-holding units in which molds to transfer an optical function surface are press-fitted and held, and an upper and a lower nest-housing units in which nests to transfer an outer diameter portion are press-fitted and held, and the mold in which the upper and lower mold-holding units are formed in simultaneous processing. In this mold, by forming the nest housing units while performing the positioning with the mold holding units simultaneously processed, the axis deviation among the mold and nests is reduced, and the outer-diameter centering accuracy of lenses is improved.

SUMMARY

According to one aspect of the present disclosure, there is provided a mold including: a fixed mold including a first mold plate constituting a fixed mold main unit; a movable mold including a second mold plate constituting a movable mold main unit; and a molding cavity by combining the fixed mold and the movable mold with each other, wherein at least one of the first and the second mold plates includes: a nest in a stepped pillar shape inserted in an insertion hole of the at least one of the first and the second mold plates, the nest including a large diameter portion engaged in the insertion hole, and a small diameter portion in which a transfer surface to form an optical function surface of a molded product is formed; and an outer-diameter forming member in a stepped cylindrical shape inserted in the insertion hole, the outer-diameter forming member including a cylindrical portion arranged around the small diameter portion of the nest, and engaged in the insertion hole, and a flange portion in which a transfer surface to form an outer diameter portion of the molded product is formed.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment of a mold will be described with reference to the drawings. Not that the present disclosure is not limited to the following embodiment. Components in the following embodiment include ones that may be easily replaced with by those skilled in the art, or ones substantially the same.

Molded Product

Figure 1:
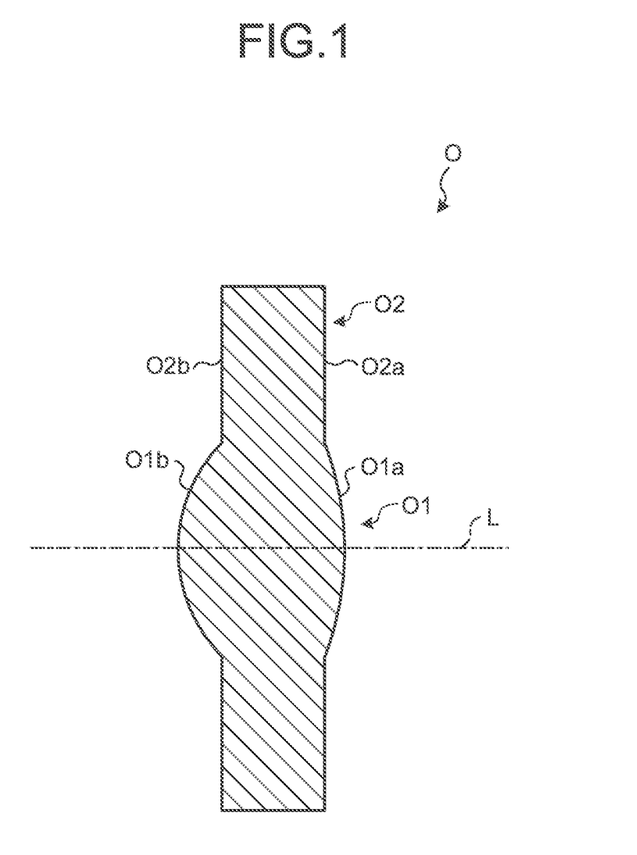
FIG. 1 is a cross-section illustrating a molded product that is molded by a mold according to an embodiment.

First, a molded product O that is molded by a mold according to an embodiment will be described, referring to FIG. 1. A molded product O illustrated in the drawing is a convex lens made from resin and used as an imaging lens of, for example, a camera, and the like.

The molded product O includes a lens portion O1, and an outer diameter portion (cut end portion) O2 in a flange form, arranged on a rim of the lens portion O1. On one side of the lens portion O1, a fixed-side optical function surface O1a having a convex surface is formed, and on the other side, a movable-side optical function surface O1b having a convex surface is formed. Moreover, on one side of the outer diameter portion O2, a fixed-side cut-end surface O2a in a flat shape is formed, and on the other side, a movable-side cut-end surface O2b in a flat shape is formed.

The molded product O is made from a molding material that allows light to pass through, which is, for example, a transparent resin material, such as a cycloolefin polymer (COP) and a polycarbonate (PC). The molded product O molded by the mold according to the embodiment has a reduced axis deviation between an axis of the outer diameter portion O2 and an optical axis of the lens portion O1, and has a high outer-diameter centering accuracy as described later.

Mold

Figure 2:
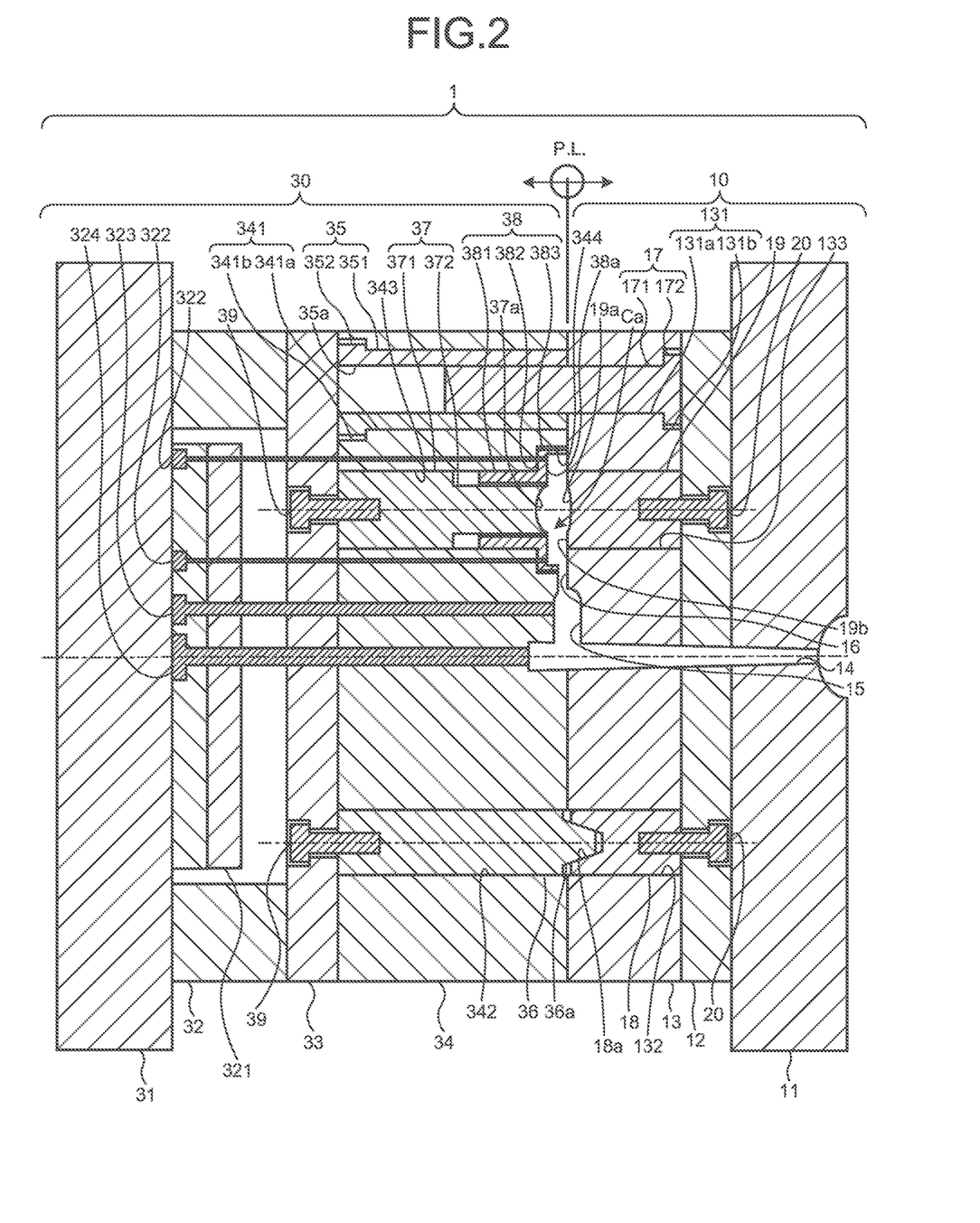
FIG. 2 is a cross-section illustrating a structure (structure in a mold-clamped state) of the mold according to the embodiment.
Figure 3:
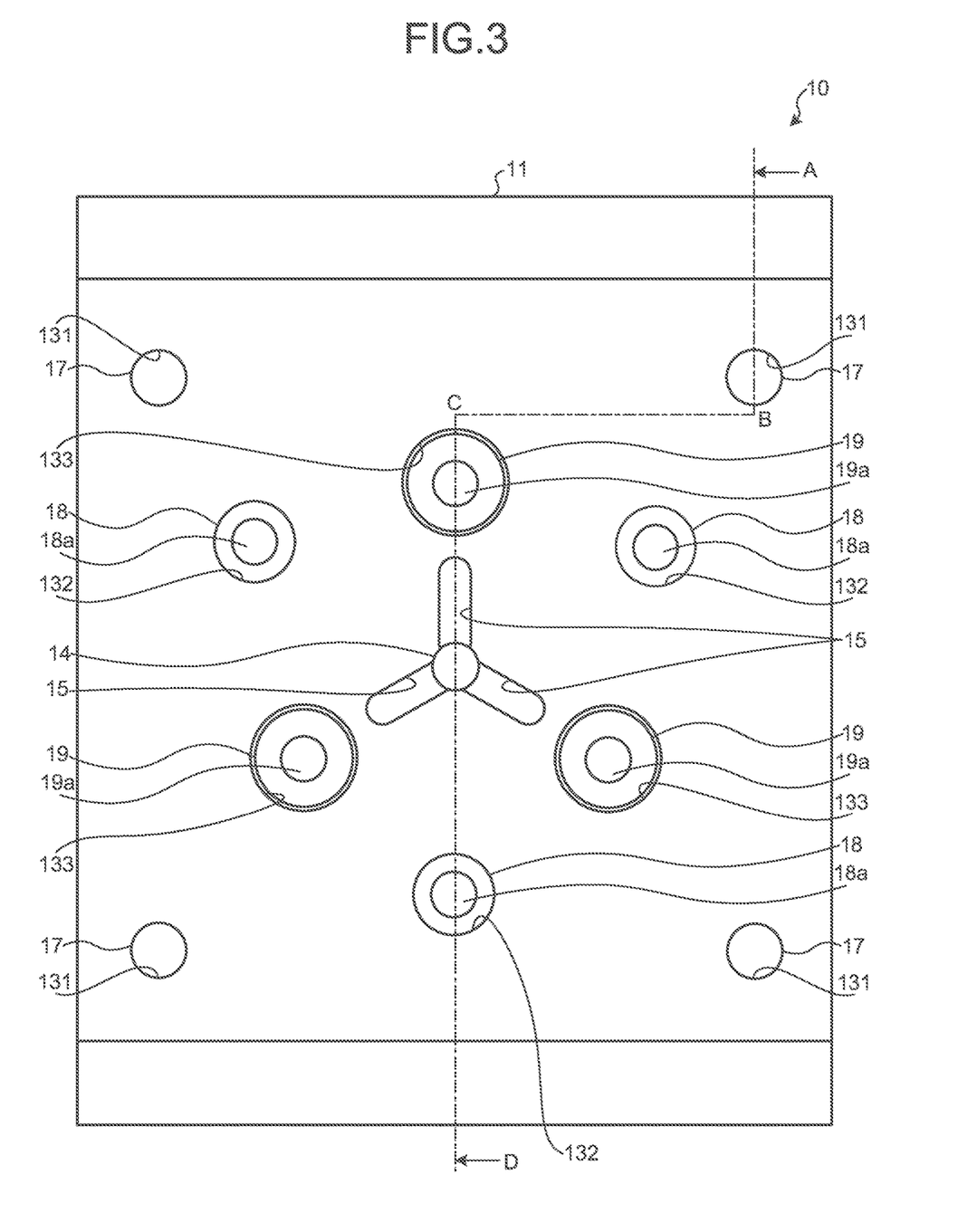
FIG. 3 is a front view illustrating a structure of a fixed mold of the mold according to the embodiment.
Figure 4:
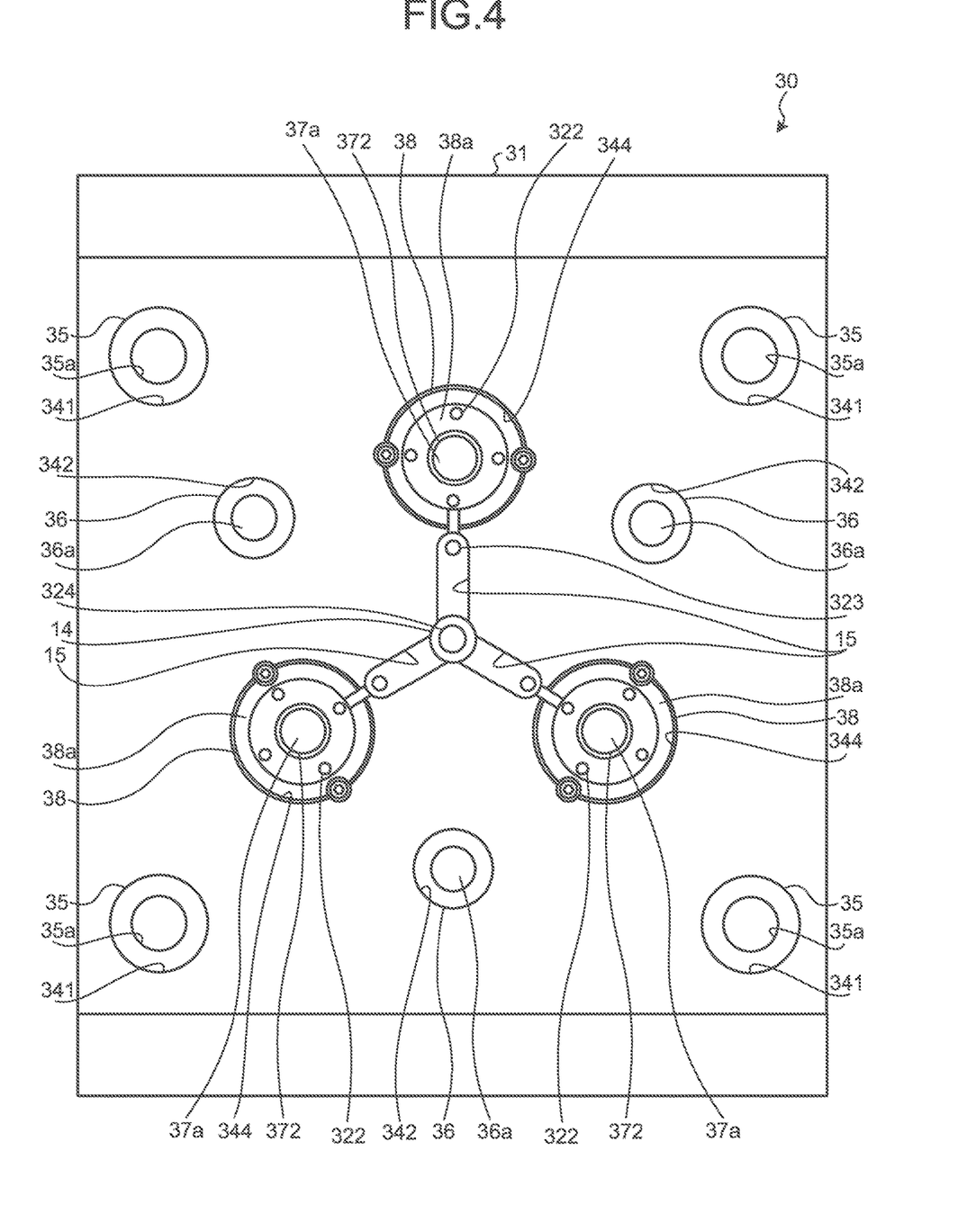
FIG. 4 is a front view illustrating a structure of a movable mold of the mold according to the embodiment.

Subsequently, a structure of a mold 1 according to the embodiment will be described, referring to FIG. 2 to FIG. 4. FIG. 2 is a combined cross-sectional view illustrating a state in which the molded product 1 is cut along a line A-B-C-D in FIG. 3. Moreover, FIG. 3 is a front view illustrating a state of a fixed mold 10 viewed from a side of a movable mold 30, and FIG. 4 is a front view illustrating a state of the movable mold 30 viewed from a side of the fixed mold 10.

The mold 1 is mounted on a platen of an injection molding machine, and has the fixed mold 10 and the movable mold 30 that are arranged to be opposing to each other about the P. L. as illustrated in FIG. 2. Out of these, the movable mold 30 is movably supported by the platen with respect to the fixed mold 10 in a mold opening-closing direction (a left-and-right direction in FIG. 2).

Fixed Mold

The fixed mold 10 includes mainly a fixed-side mount plate 11, a fixed-side support plate 12, and a fixed-side mold plate 13 constituting a mold main unit. The fixed-side support plate 12 and the fixed-side mold plate 13 are fixed in a state of being layered on the fixed-side mount plate 11.

The fixed-side mold plate 13 has, as illustrated in FIG. 2 and FIG. 3, four guide-pin insertion holes 131, three positioning-pin insertion holes 132, and three nest insertion holes 133 formed therein. In the guide-pin insertion holes 131, guide pins 17 are inserted, in the positioning-pin insertion holes 132, fixed-side positioning pins 18 are inserted, and in the nest insertion holes 133, fixed-side nests (fixed-side molds) 19 are inserted.

The guide pin 17 includes, specifically, a small diameter portion 171 that is arranged in a small diameter portion 131a of the guide-pin insertion hole 131, and a large diameter portion 172 that is arranged in a large diameter portion 131b of the guide-pin insertion hole 131. Thus, the guide pin 17 is engaged in the guide-pin insertion hole 131, to be in a locked state. Moreover, a part of the small diameter portion 171 of the guide pin 17 is inserted in a guide-pin insertion hole 35a of a guide push 35 described later.

At a distal end portion of the fixed-side positioning pin 18, an engaging concave portion 18a in a conical shape, a diameter of which increases gradually toward a distal end side is arranged, and in the engaging concave portion 18a, an engaging convex portion 36a of the movable-side positioning pin 36 engages. Furthermore, a proximal end portion of the fixed-side positioning pin 18 is fixed to the fixed-side support plate 12 with a fixing screw 20 embedded in the fixed-side support plate 12.

The fixed-side nest 19 is formed in a pillar shape, and three of them are arranged in the fixed-side mold plate 13. At a distal end of the fixed-side nest 19, a first transfer surface 19a in a concave surface to form the fixed-side optical function surface O1a of the molded product O (refer to FIG. 1), and a second transfer surface 19b in a flat surface to form the fixed-side cut-end surface O2a of the molded product O are formed. Moreover, a proximal end of the fixed-side nest 19 is fixed to the fixed-side support plate 12 with the fixing screw 20 embedded in the fixed-side support plate 12.

Movable Mold

The movable mold 30 includes a movable-side mount plate 31, a spacer block 32, a movable-side support plate 33, and a movable-side mold plate 34 constituting a mold main unit. The spacer block 32, the movable-side support plate 33, and the movable-side mold plate 34 are fixed, layered on the movable-side mount plate 31.

On an inner side of the spacer block 32, an ejector plate 321 that comes into or out of the movable-side mount plate 31 is arranged. This ejector plate 321 includes, as illustrated in FIG. 2 and FIG. 4, twelve pieces of first ejector pins 322, three pieces of second ejector pins 323, and one piece of third ejector pin 324. The first to the third ejector pins 322, 323, 324 function as a mechanism to knock out the molded product O obtained after molding.

As for the first ejector pins 322, four pieces of them are arranged in each position of rotationally symmetric positions about a first transfer surface 37a of a movable-side nest 37. Three pieces of the second ejector pins 323 are arranged at rotationally symmetric positions about the third ejector pin 324, corresponding to the position of a runner 15. One piece of the third ejector pin 324 is arranged at a position coaxial to a sprue 14.

The movable-side mold plate 34 has, as illustrated in FIG. 2 and FIG. 4, four guide-pin insertion holes 341, three positioning-pin insertion holes 342, three nest insertion holes 343, and three outer-diameter-forming member insertion holes 344 formed therein. In the guide-pin insertion holes 341, guide bushes 35 are inserted, in the positioning-pin insertion holes 342, movable-side positioning pins 36 are inserted, and in the nest insertion holes 343, movable-side nests (movable-side molds) 37 and a part of an outer-diameter forming member 38 (small-diameter cylindrical portion 381) are inserted. In the outer-diameter-forming member insertion holes 344, a part of the outer-diameter forming members 38 (large-diameter cylindrical portion 383) are arranged.

The nest insertion holes 343 are straight holes that have an opening on a side of the fixed-side mold plate 13 of the fixed mold 10 in the movable-side mold plate 34 of the movable mold 30. That is, the nest insertion holes 343 are formed to have a uniform diameter from a proximal side (movable-side support plate 33 side) to a distal end side (outer-diameter-forming member insertion holes 344 side).

The guide bush 35 includes, specifically, a small diameter cylindrical portion 351 that is arranged in a small-diameter hole portion 341a of the guide-pin insertion hole 341, and a large-diameter cylindrical portion 352 that is arranged in a large-diameter hole portion 341b of the guide-pin insertion hole 341. Thus, the guide bush 35 is engaged in the guide-pin insertion hole 341, to be in a locked state. Moreover, a part of the small diameter portion 171 of the guide pin 17 described above is inserted in a part of the guide-pin insertion hole 35a of the guide bush 35.

At a distal end portion of the movable-side positioning pin 36, an engaging convex portion 36a in a conical shape, a diameter of which decreases gradually toward a distal end side is arranged, and the engaging convex portion 36a engages in the engaging concave portion 18a of the fixed-side positioning pin 18 described above. Furthermore, a proximal end portion of the movable-side positioning pin 36 is fixed to the movable-side support plate 33 with a fixing screw 39 embedded in the movable-side support plate 33.

The movable-side nest 37 is formed in a stepped pillar shape, and three of them are arranged in the movable-side mold plate 34. The movable-side nest 37 includes a large diameter portion 371 and a small diameter portion 372.

The large diameter portion 371 is engaged in the nest insertion hole 343. A proximal end portion of the large diameter portion 371 (proximal end portion of the movable-side nest 37) is fixed to the movable-side support plate 33 with the fixing screw 39 embedded in the movable-side support plate 33. An outer diameter of the large diameter portion 371 is substantially equal to an inner diameter of the nest insertion hole 343. Accordingly, an outer peripheral surface of the large diameter portion 371 and an inner peripheral surface of the nest insertion hole 343 are in intimate contact with each other, and no gap is formed between them. When manufacturing the large diameter portion 371, it is processed based on the nest insertion hole 343 so that the outer diameter of the large diameter portion 371 is to be equal to the inner diameter of the nest insertion hole 343.

The small diameter portion 372 is arranged inside the small-diameter cylindrical portion 381 of the outer-diameter forming member 38 described later. At a distal end portion of the small diameter portion 372 (distal end portion of the movable-side nest 37), the first transfer surface 37a in a concave shape to form the movable-side optical function surface O1b of the molded product O (refer to FIG. 1) is formed.

The outer diameter of the small diameter portion 372 is smaller than the inner diameter of the small-diameter cylindrical portion 381 of the outer-diameter forming member 38. Therefore, the outer peripheral surface of the small diameter portion 372 and the inner peripheral surface of the small-diameter cylindrical portion 381 are not in intimate contact with each other, and a predetermined amount of gap is formed between them. By thus arranging a gap between the outer peripheral surface of the small diameter portion 372 and the inner peripheral surface of the small-diameter cylindrical portion 381, the movable-side nest 37 comes in contact with the movable-side mold plate 34 only via the nest insertion hole 343. Thus, it becomes possible to perform positioning of the movable-side nest 37 with respect to the movable-side mold plate 34 based only on the nest insertion hole 343.

The gap between the outer peripheral surface of the small diameter portion 372 and the inner peripheral surface of the small-diameter cylindrical portion 381 is set to, for example, 10 µm to 20 µm. When, for example, cycloolefin polymer is used as a molding material of the molded product O, even if a gap in the above range is formed between the outer peripheral surface of the small diameter portion 372 and the inner peripheral surface of the small-diameter cylindrical portion 381, the molding material is not to enter the gap during molding, a failure, such as a burr, is not to occur in the molded product O either. If a resin having higher fluidity than cycloolefin polymer is used as the molding material, an amount of the gap between the outer peripheral surface of the small diameter portion 372 and the inner peripheral surface of the small-diameter cylindrical portion 381 should be set smaller than the above range.

The movable-side nest 37 is made from a material having a linear expansion coefficient equal to the outer-diameter forming member 38 described later. A specific material to form the movable-side nest 37 and the outer-diameter forming member 38 is not particularly limited, but it is preferable to be a material having as large linear expansion coefficient as possible. By forming the movable-side nest 37 and the outer-diameter forming member 38 with a material having a large linear expansion coefficient, an adhesive strength between the movable-side nest 37 and the outer-diameter forming member 38, and the nest insertion hole 343 may be improved as thermal expansion of the movable-side nest 37 and the outer-diameter forming member 38 at molding increases.

The outer-diameter forming member 38 is formed in a stepped cylindrical shape, and three of them are arranged in the movable-side mold plate 34. The outer-diameter forming member 38 includes the small-diameter cylindrical portion 381, a flange portion 382, and the large-diameter cylindrical portion 383.

The small-diameter cylindrical portion 381 is arranged around the small diameter portion 372 of the movable-side nest 37, and is engaged in the nest insertion hole 343. The outer diameter of the small-diameter cylindrical portion 381 is substantially equal to the inner diameter of the nest insertion hole 343. Therefore, the outer peripheral surface of the small-diameter cylindrical portion 381 and the inner peripheral surface of the nest insertion hole 343 are in intimate contact with each other, and no gap is formed therebetween. When manufacturing the small-diameter cylindrical portion 381, it is processed based on the nest insertion hole 343 so that the outer diameter of the small-diameter cylindrical portion 381 is to be equal to the inner diameter of the nest insertion hole 343.

In the flange portion 382, a second transfer surface 38a in a flat shape to form the movable-side cut-end surface O2b in the outer diameter portion O2 of the molded product O (refer to FIG. 1) is formed. Moreover, in the flange portion 382, four pieces of the first ejector pins 322 are arranged piercing therethrough in a direction of thickness.

The large-diameter cylindrical portion 383 is arranged inside the outer-diameter-forming member insertion hole 344. The outer diameter of the large-diameter cylindrical portion 383 is smaller than the inner diameter of the outer-diameter-forming member insertion holes 344. Therefore, an outer peripheral surface of the large-diameter cylindrical portion 383 and an inner peripheral surface of the outer-diameter-forming member insertion holes 344 are not in intimate contact with each other, and a predetermined amount of gap is formed between them. By thus arranging a gap between the outer peripheral surface of the large-diameter cylindrical portion 383 and the inner peripheral surface of the outer-diameter-forming member insertion holes 344, the outer-diameter forming member 38 comes in contact with the movable-side mold plate 34 only via the nest insertion hole 343. Thus, it becomes possible to perform positioning of the outer-diameter forming member 38 with respect to the movable-side mold plate 34 based only on the nest insertion hole 343.

In the mold 1 having the structure as described above, the movable mold 30 is clamped with respect to the fixed mold 10, and the fixed mold 10 and the movable mold 30 are thereby combined with each other as illustrated in FIG. 2, to form three molding cavities Ca that determine a shape of the molded product O (for example, a convex lens). These molding cavities Ca are formed at least between the first transfer surface 19a and the second transfer surface 19b of the fixed-side nest 19, the first transfer surface 37a of the movable-side nest 37, the second transfer surface 38a of the flange portion 382 of the outer-diameter forming member 38, and the inner peripheral surface of the large-diameter cylindrical portion 383 of the outer-diameter forming member 38. In the present embodiment, as the molding material described above is filled in these molding cavities Ca, a total of three molded products O may be molded.

Moreover, in the mold 1, as illustrated in FIG. 2 to FIG. 4, as the fixed mold 10 and the movable mold 30 are combined, one unit of the sprue 14, three units of the runners 15, and three units of gates 16 are formed. The sprue 14, the runners 15, and the gates 16 are space formed in a pillar shape, and function as a flowing path at the time when filling the molten molding material into the molding cavities Ca.

The sprue 14 is formed in a direction opposing to the fixed mold 10 and the movable mold 30, and is formed to pierce through the fixed-side mount plate 11, the fixed-side support plate 12, and the fixed-side mold plate 13. Furthermore, a distal end portion of the sprue 14 is formed as a concave portion formed in the movable-side mold plate 34. The runners and the gates 16 are formed in a direction perpendicular to the direction in which the fixed mold and the movable mold oppose to each other, and are structured with notches formed in the fixed-side mold plate 13 and the movable-side mold plate 34, respectively.

Furthermore, in the mold 1, as illustrated in FIG. 2, holes opposing to each other between the fixed-side mold plate 13 and the movable-side mold plate 34 are all formed at the same time, coaxially and to have the same diameter. For example, the positioning-pin insertion holes 132 and the positioning-pin insertion holes 342 are formed, when manufacturing the fixed-side mold plate 13 and the movable-side mold plate 34, by making holes at the same time on the same axis in a state in which the fixed-side mold plate 13 and the movable-side mold plate 34 are arranged to overlap with each other. Similarly, the nest insertion holes 133 and the nest insertion holes 343 are formed, when manufacturing the fixed-side mold plate 13 and the movable-side mold plate 34, by making holes at the same time on the same axis in a state in which the fixed-side mold plate 13 and the movable-side mold plate 34 are arranged to overlap with each other.

As described, by forming holes opposing to each other between the fixed-side mold plate 13 and the movable-side mold plate 34 coaxially, and in the same diameter, the positioning deviation, for example, between the positioning-pin insertion holes 132 and the positioning-pin insertion holes 342, and between the nest insertion holes 133 and the nest insertion holes 343 may be controlled to be small, and it becomes possible to clamp the fixed mold 10 and the movable mold 30 in a state in which the axis deviation is small.

According to the mold 1 as described above, the movable-side nest 37 to form the movable-side optical function surface O1b of the molded product O and the outer-diameter forming member 38 to form the movable-side cut-end surface O2b of the molded product O are respectively engaged in one nest insertion hole 343, and the movable-side nest 37 and the outer-diameter forming member 38 are thereby centered based on the nest insertion hole 343. Therefore, positions of the first transfer surface 37a and the second transfer surface 38a are highly accurately positioned, and in the molded product O obtained after molding, the axis deviation between the axis of the outer diameter portion O2 and the optical axis of the lens portion O1 may be suppressed to be small, and the molded product O having high outer-diameter centering accuracy may be stably obtained.

Note that the outer-diameter forming member 38 that is engaged in the nest insertion hole 343 together with the movable-side nest 37 is formed in a stepped cylindrical shape as a whole. Therefore, as for the outer-diameter forming member 38 itself, it is possible to perform centering easily by checking a runout between the outer diameter and the inner diameter.

Moreover, according to the mold 1, an unnecessary structure (for example, the "conical surface engaging with a silver tube" disclosed in JP-A-2012-22074) is not added to the molded product O obtained after molding and, therefore, the outer diameter of the molded product O may be reduced.

For example, in the mold 1 described above, a structure in which three pieces of the molding cavities Ca are formed, and three pieces of the molded products O are injection-molded at once has been described, but the number of the molded products O to be molded is not particularly limited. That is, in the mold 1, two or less unit of the molding cavity Ca, or four or more units of the molding cavities Ca may be formed.

Furthermore, in the mold 1 described above, the outer-diameter forming member 38 is arranged only in the movable mold 30 out of the fixed mold 10 and the movable mold 30, but an outer-diameter forming member may be arranged in both of the fixed mold 10 and the movable mold 30, or only in the fixed mold 10, as necessary.

Moreover, in the mold 1 described above, the molded product O is knocked out by pushing the movable-side cut-end surface O2b of the outer diameter portion O2 of the molded product O obtained after molding by an ejecting motion of the first ejector pin 322, but the molded product O may be knocked out, for example, by pushing the movable-side nest 37 toward the fixed-side nest 19. Thus, the molded product O may be knocked out, for example, even when the outer diameter portion O2 of the molded product O is small, and it is impossible to push the outer diameter portion O2 with the first ejector pin 322.

According to the present disclosure, a nest to form an optical function surface of a molded product and an outer-diameter forming member to form an outer diameter portion of the molded product are respectively engaged in one insertion hole, and the nest and the outer-diameter forming member are thereby centered based on the insertion hole. Therefore, positions of a transfer surface to form the optical function surface and a transfer surface to from the outer diameter portion are highly accurately positioned, and in the molded product obtained after molding, the axis deviation between an axis of the outer diameter portion and an optical axis of a lens portion may be suppressed to be small, and the molded product having high outer-diameter centering accuracy may be stably obtained. Moreover, according to the present disclosure, an unnecessary structure (for example, a conical surface engaging with a silver tube, and the like) is not added to the molded product obtained after molding and, therefore, the outer diameter of the molded product may be reduced.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mold comprising:
a fixed mold including a first mold plate constituting a fixed mold main unit;
a movable mold including a second mold plate constituting a movable mold main unit; and
a molding cavity formed by combining the fixed mold and the movable mold with each other,
wherein at least one of the first and the second mold plates includes:
  a nest in a stepped pillar shape inserted in an insertion hole of the at least one of the first and the second mold plates, the nest including:
    a large diameter portion engaged in the insertion hole, and
    a small diameter portion in which a first transfer surface to form an optical function surface of a molded product is formed; and
  an outer-diameter forming member in a stepped cylindrical shape inserted in the insertion hole, the outer-diameter forming member including:
    a cylindrical portion arranged around the small diameter portion of the nest, and engaged in the insertion hole, and
    a flange portion in which a second transfer surface to form an outer diameter portion of the molded product is formed, and
wherein the nest and the outer-diameter forming member are provided as a part of the at least one of the first and the second mold plates.

2. The mold according to claim 1, wherein:
the insertion hole comprises a straight hole in the at least one of the first and the second mold plates, the straight hole including an opening on a side facing another one of the first and the second mold plates, and the mold further comprises a gap between an outer peripheral surface of the small diameter portion of the nest and an inner peripheral surface of the cylindrical portion of the outer-diameter forming member.

3. The mold according to claim 1, wherein the molding material comprises cycloolefin polymer.

\* \* \* \* \*